US009346467B2

(12) United States Patent
Hahne et al.

(10) Patent No.: US 9,346,467 B2
(45) Date of Patent: May 24, 2016

(54) DRIVING ASSISTANCE APPARATUS FOR ASSISTANCE WITH DRIVING ALONG NARROW ROADWAYS

(75) Inventors: Uwe Hahne, Buettelborn (DE); Marco Moebus, Mainz (DE); Markus Armbrust, Wonsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 454 days.

(21) Appl. No.: 13/567,619

(22) Filed: Aug. 6, 2012

(65) Prior Publication Data
US 2013/0032421 A1 Feb. 7, 2013

(30) Foreign Application Priority Data

Aug. 4, 2011 (DE) .................... 10 2011 109 491

(51) Int. Cl.
  *B62D 15/02* (2006.01)
  *G05D 1/00* (2006.01)
  (Continued)

(52) U.S. Cl.
  CPC ....... *B60W 50/0097* (2013.01); *B60W 50/0098* (2013.01); *B60W 50/082* (2013.01);
  (Continued)

(58) Field of Classification Search
  CPC ............. B62D 15/028; B62D 15/0285; B62D 15/025; B62D 6/00; G01C 21/3641; G01C 21/3484; G01C 21/00; B60W 2050/0089; B60W 2530/14; G05D 1/00; G05D 1/0011; G05D 1/0016; G05D 1/002; G05D 1/0033; G05D 1/0038; G05D 1/0044; G05D 1/0088; G05D 1/02; G05D 1/021
  USPC ................. 180/204, 446; 340/435, 436, 465; 342/70, 71; 382/103, 104; 701/1, 23, 701/25, 26, 41, 408, 412, 446, 468, 469, 701/472, 301
  See application file for complete search history.

(56) References Cited

U.S. PATENT DOCUMENTS 4,069,888 A * 1/1978 Wolters et al. ................ 180/169
4,361,202 A * 11/1982 Minovitch .................... 180/168
(Continued)

FOREIGN PATENT DOCUMENTS

DE 10321904 A1 8/2004
DE 102005009703 A1 9/2006
(Continued)

OTHER PUBLICATIONS

USPTO, Non-Final Office Action for U.S. Appl. No. 13/567,637, mailed Feb. 6, 2014.
(Continued)

*Primary Examiner* — Joseph Rocca
*Assistant Examiner* — Daniel Yeagley
(74) *Attorney, Agent, or Firm* — Ingrassia Fisher & Lorenz PC

(57) ABSTRACT

A driving assistance apparatus for a motor vehicle for assistance with driving along narrow roadways is provided. The apparatus includes a data acquisition unit for acquiring route data while driving on a route obtained from wheel and steering angle sensors, a trajectory storage unit for recording the route data, and a triggering unit for triggering the vehicle based on the route data. The apparatus is coupled to a satellite navigation receiver for determining boundary value position data at the time of commencement and/or end of the route. A storage unit stores the boundary value position data for the route data. An approach checking unit checks whether the vehicle is approaching the commencement or end of the route based on the boundary value position data and generates a position approach signal if the motor vehicle is approaching the commencement or end of the route.

14 Claims, 1 Drawing Sheet

(51) Int. Cl.
*B60W 50/00* (2006.01)
*G05D 1/02* (2006.01)
*B60W 50/08* (2012.01)
*B60W 50/14* (2012.01)

(52) U.S. Cl.
CPC .......... *B60W 50/14* (2013.01); *B62D 15/0285* (2013.01); *G05D 1/00* (2013.01); *G05D 1/0038* (2013.01); *G05D 1/021* (2013.01); *B60W 2050/0089* (2013.01); *Y02T 10/84* (2013.01)

(56) References Cited

U.S. PATENT DOCUMENTS

| | | | |
|---|---|---|---|
| 5,684,696 A * | 11/1997 | Rao et al. | 701/25 |
| 5,764,015 A | 6/1998 | Shimizu et al. | |
| 5,931,252 A * | 8/1999 | Shimizu et al. | 180/204 |
| 6,016,881 A * | 1/2000 | Sakai et al. | 180/204 |
| 6,963,798 B2 | 11/2005 | Heyse | |
| 7,092,818 B2 | 8/2006 | Ohler | |
| 7,640,107 B2 * | 12/2009 | Shimizu et al. | 701/523 |
| 7,711,464 B2 * | 5/2010 | Kaufmann | 701/41 |
| 7,741,959 B2 * | 6/2010 | Obradovich | B60R 16/0231 340/426.24 |
| 8,118,126 B2 * | 2/2012 | Rattapon et al. | 180/168 |
| 8,285,452 B2 * | 10/2012 | Ichinose et al. | 701/41 |
| 8,311,696 B2 * | 11/2012 | Reeve | 701/23 |
| 8,428,821 B2 * | 4/2013 | Nilsson | 701/41 |
| 8,600,655 B2 * | 12/2013 | Ishikawa et al. | 701/300 |
| 8,742,947 B2 * | 6/2014 | Nakazono et al. | 340/932.2 |
| 2002/0183906 A1 * | 12/2002 | Ikeda | 701/36 |
| 2003/0187577 A1 * | 10/2003 | McClure et al. | 701/213 |
| 2005/0140207 A1 * | 6/2005 | Goebels et al. | 303/140 |
| 2005/0269145 A1 * | 12/2005 | Schmidt | 180/204 |
| 2006/0229808 A1 * | 10/2006 | Manabe | 701/210 |
| 2007/0188349 A1 * | 8/2007 | Staniszewski | 340/932.2 |
| 2007/0282503 A1 * | 12/2007 | Luke | 701/44 |
| 2008/0231701 A1 | 9/2008 | Greenwood et al. | |
| 2008/0269956 A1 * | 10/2008 | Dix et al. | 701/1 |
| 2008/0270021 A1 * | 10/2008 | Yamada | 701/201 |
| 2009/0125235 A1 * | 5/2009 | Chen et al. | 701/210 |
| 2009/0177677 A1 | 7/2009 | Mikusiak | |
| 2009/0228204 A1 | 9/2009 | Zavoli et al. | |
| 2009/0259365 A1 * | 10/2009 | Rohlfs et al. | 701/41 |
| 2010/0063648 A1 * | 3/2010 | Anderson | 701/1 |
| 2010/0226544 A1 * | 9/2010 | Uchida et al. | 382/107 |
| 2010/0235035 A1 * | 9/2010 | Nishira et al. | 701/29 |
| 2010/0299021 A1 | 11/2010 | Jalili | |
| 2011/0057814 A1 * | 3/2011 | Park | 340/932.2 |
| 2011/0288727 A1 * | 11/2011 | Krautter et al. | 701/41 |
| 2013/0035821 A1 | 2/2013 | Bonne et al. | |
| 2014/0032031 A1 * | 1/2014 | Okamura et al. | 701/23 |

FOREIGN PATENT DOCUMENTS

| | | |
|---|---|---|
| DE | 102005057251 A1 * | 6/2007 |
| DE | 102006005059 A1 | 8/2007 |
| DE | 102006026092 A1 | 12/2007 |
| DE | 102007002261 A1 | 8/2008 |
| DE | 102008033821 A1 | 1/2010 |
| DE | 102009030784 A1 | 2/2010 |
| DE | 102009015161 A1 | 9/2010 |
| EP | 1858744 B1 | 1/2009 |
| EP | 2105700 A1 | 9/2009 |
| GB | 2475871 A | 6/2011 |
| JP | H09136660 A | 5/1997 |
| JP | 2007320371 A | 12/2007 |
| JP | 2009286211 A | 12/2009 |
| JP | 2010282344 A | 12/2010 |

OTHER PUBLICATIONS

Great Britain Patent Office, Great Britain Search Report for Great Britain Application No. 1213033.2, dated Nov. 5, 2012.

* cited by examiner

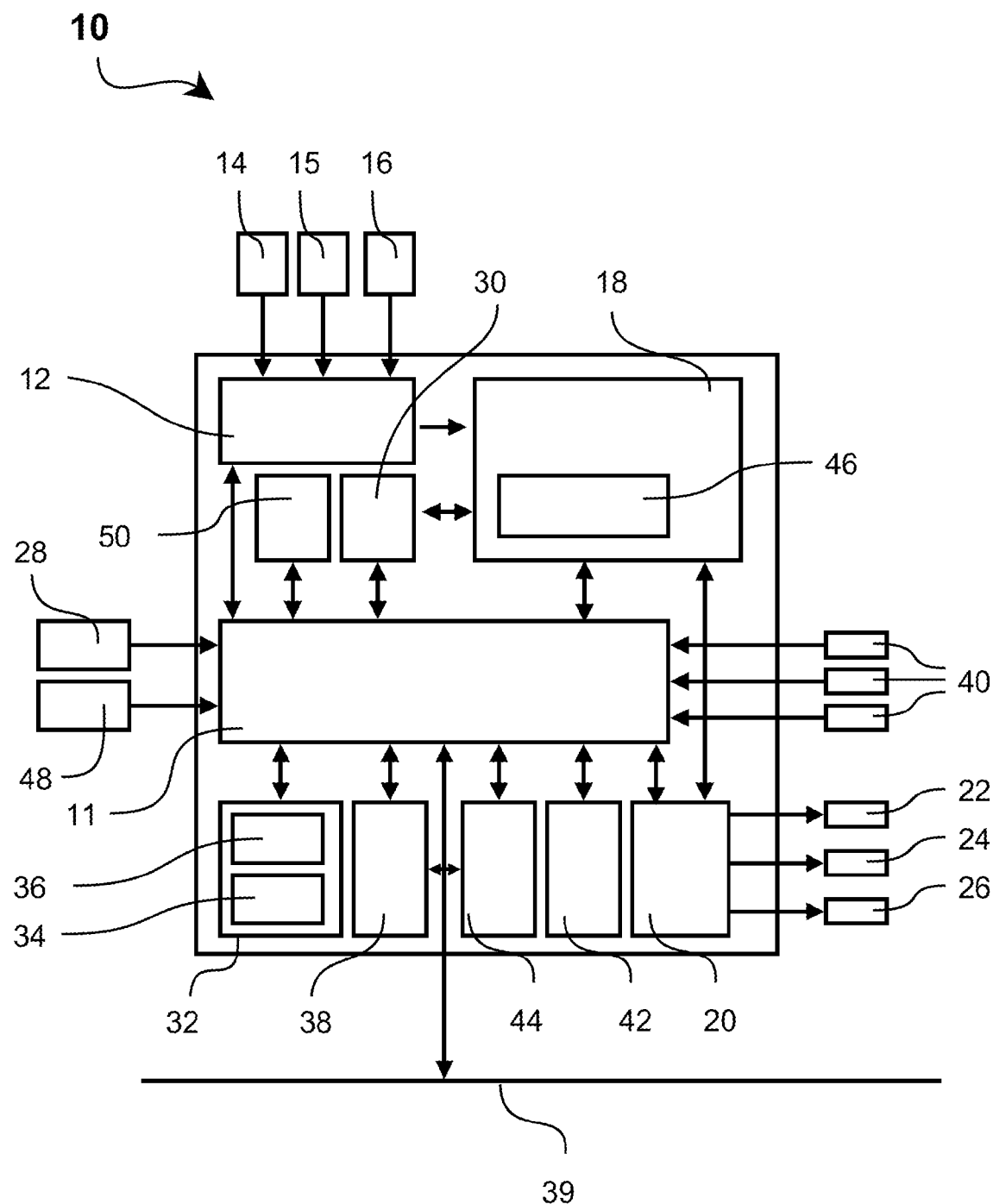

DRIVING ASSISTANCE APPARATUS FOR ASSISTANCE WITH DRIVING ALONG NARROW ROADWAYS

CROSS-REFERENCE TO RELATED APPLICATION

This application claims priority to German Patent Application No. 10 2011 109 491.5, filed Aug. 4, 2011, which is incorporated herein by reference in its entirety.

TECHNICAL FIELD

The technical field relates to a driving assistance apparatus for a motor vehicle for assistance with driving along narrow roadways, comprising a data acquisition unit for acquiring data on the route to be covered from wheel and steering angle sensors, and a storage unit for recording the route data as well as a triggering unit for triggering the motor vehicle on the basis of the recorded route data, for driving along the recorded route in the same or reverse direction.

BACKGROUND

A generic driving assistance apparatus is known from EP 1 858 744 B1, in which short path trajectories of about 5 meters (m) traveled by the vehicle concerned and determined by wheel and steering angle sensors are recorded and are available for automated or partially automated driving in the same or reverse direction so that it is possible to drive along narrow road areas, for example, entrances into garages or exits from such under confined conditions. A disadvantage here is that the recorded trajectory is actually valid from a certain starting point, which, however, is not definable. For example, the path trajectory is recorded when the vehicle is standing in front of a parking space (of a garage). If however the vehicle is standing at a different location at a later time point and the automatic parking is started, this can have the result that the driving in process cannot be executed, in particular if the starting state is laterally offset or further away from the starting state in the recording process.

Another driving assistance apparatus is known from DE 196 35 892 A1. This makes it easier to park under confined conditions. In this case, firmly stored optimized driving trajectories (so-called model driving data) that were determined with the assistance of an experienced driver are taken as the basis. In this way, the vehicle can be moved automatically and without the intervention of the possibly inexperienced driver into the parking space. This apparatus requires a selection of stored typical parking situations and is not able to take account of special actual circumstances (e.g. curbstones or posts), which make the parking process difficult in the particular case.

It is at least one object herein to configure a driving assistance apparatus to be substantially more flexible to enable a parking process under substantially more different conditions than was possible hitherto. In addition, other objects, desirable features and characteristics will become apparent from the subsequent summary and detailed description, and the appended claims, taken in conjunction with the accompanying drawings and this background.

SUMMARY

A driving assistance apparatus for a motor vehicle for assistance with driving along narrow roadways is provided. The driving assistance apparatus includes a data acquisition unit for acquiring data on the route to be covered from wheel and steering angle sensors, a storage unit for recording the route data and a triggering unit for triggering the motor vehicle on the basis of the recorded route data, for driving along the recorded route in the same or reverse direction. The driving assistance apparatus is coupled to a satellite navigation receiver for determining boundary value position data at the time of commencement and/or end of the route. The storage unit stores the boundary value position data for the route data, and an approach checking unit checks whether the motor vehicle is approaching the stored commencement or end of the route and in this case, generates a position approach signal. When recording the trajectory data, advantageously available inertial sensors, in particular signals of a yaw rate sensor are used to increase the accuracy.

In an embodiment, because absolute position data are stored for each stored route (trajectory), the system determines on the one hand whether it is located in the vicinity of a stored trajectory. The position approach signal produced in this case can preferably be used to suggest the automatic driving along the trajectory to the driver. On the other hand, by means of a comparison of the current position with the stored boundary value position data, it can be determined whether the vehicle is located sufficiently near to a recorded trajectory so that this can automatically be driven along or initially—preferably automatically—the vehicle is moved to the trajectory in order to then drive along this. It can further be checked, when a position approach signal occurs, whether further trajectories exist in spatial proximity to the trajectory concerned. It can thus be expedient that the driver has various parking possibilities available, e.g. his own garage space and alternatively a space in front of the building or a parking space for several users, where each user has access to an arbitrary free parking space. In such a case it is expedient if the driver is offered the various alternative trajectories for selection.

According to an exemplary embodiment, the position approach signal can be supplied to a driver communication unit, which provides the driver with the possibility for activating an automatic driving of the corresponding route and optionally, when the driver decides on this, activates the triggering unit for autonomous driving of the route by the motor vehicle. The driver therefore does not need to worry whether specific trajectories are recorded or he need not interactively select the desired trajectory from a plurality of stored trajectories but this is done for him by the system. The driving assistance apparatus therefore makes it considerably easier to operate the system since the driver no longer needs to consider whether a trajectory is stored or not. Preferably the approach to a recorded trajectory can be signaled to the driver so that initially a manual triggering is possible. When sufficiently close, an automatic driving into the trajectory and subsequent driving along the same can be proposed and executed if the driver is in agreement.

According to another embodiment, the driving assistance apparatus comprises a digital map unit with road map information, which communicates with the satellite navigation receiver and outputs road class data (e.g. freeway, expressway, one-way street, blind alley) and/or environmental data (e.g. building) from the road map information by means of the current position data of the motor vehicle. These can be used by the driving assistance apparatus to omit a trajectory recording or an approach signaling, e.g., when it is established that the vehicle is located on a freeway or expressway and therefore driving along a trajectory does not come into consideration. Typically the road map information is either stored in the digital map unit itself or is loaded by a bus system (e.g. CAB bus) from other sources inside the vehicle, preferably a navigation system. Alternatively or additionally, this information can be loaded via external environmental communication channels.

According to a further embodiment, the digital map unit comprises map data having position attribute data (parking space, blind alley, narrow street) to check whether the motor vehicle is located in the environs of road regions having restricted scope for navigation and in such a case proposes the recording of a trajectory to the driver or executes this automatically. The driver is therefore further unburdened and only needs to briefly confirm whether a recording should be carried out or in the event of the recording being activated automatically, the driving assistance apparatus asks the driver, after determining that the vehicle has come to a halt, whether the trajectory just recorded should be stored permanently.

In another embodiment, the driving assistance apparatus comprises environmental detection sensors, by which the environmental data can be recorded when driving along the route and the storage device stores the environmental data for the corresponding route data. In an embodiment, the environmental detection sensors are optical sensors. Alternatively or additionally, the environmental detection sensors can also comprise other types of sensors, in particular ultrasound, lidar, or radar devices. Furthermore, an image processing unit is provided, which creates object data of objects located in the vicinity of the route by means of the environmental data, wherein the storage device stores the object data on the corresponding route data. The environment of the trajectory is thus co-recorded and provides more accurate information on the route course so that in particular more degrees of freedom are opened up when repeatedly driving along the trajectory. It can thus be determined whether a lateral offset to the stored trajectory can readily be driven or as a result of particular obstacles (e.g. curbstones, posts), a precise driving along the trajectory is required. Preferably curbstone sensors can be provided for this purpose, which take into account the course of curbstones disposed in the vicinity of trajectories.

According to a further embodiment, the driving assistance apparatus comprises an environmental data matching unit, which matches object data determined by the environmental detection sensors with the environmental data determined by the digital map unit. In this way, the virtual trajectory environment image is further refined so that, for example, objects located temporarily in the vicinity such as persons or parked bicycles/prams can be appropriately taken into account as such.

In another embodiment, the storage device comprises an additional circular buffer region, for example in the form of a RAM, which stores the route data during motion of the motor vehicle and, if these are co-recorded, additionally the environmental data and/or the object data and for this deletes the oldest data in each case. Consequently, a trajectory of the route last covered is available at any time, which can either be stored permanently for future use if the driver desires this or this can be used immediately if this route is to be driven back.

The driving assistance apparatus communicates with a driver identification unit, and in the storage device the route data and the additional data stored for this purpose are stored for each driver, according to another embodiment. If an approach to stored trajectories is then examined subsequently, either only the trajectories assigned to this can be suggested to the driver or for each trajectory it is signaled whether these originate from him or other persons. It can thus be prevented that trajectories to be assigned to inexperienced drivers are suggested to experienced drivers.

According to an embodiment, the driving assistance apparatus comprises a trajectory introducing unit which determines a suitable route on which the motor vehicle can be moved in a selected trajectory. Such a trajectory introducing unit determines by the position and alignment of the motor vehicle and the trajectory data a shortest possible route on which the vehicle is guided on the trajectory and can then be moved further along the trajectory.

The driving assistance apparatus comprises a time unit in order to store the recording time for each trajectory recording, according to a further embodiment. Consequently, when selecting a plurality of available trajectories, a suggestion or a weighting can be made according to the actual clock time. If a trajectory was recorded in the evening, for example, on approaching, such a trajectory recorded in the evening can be suggested preferentially over a trajectory recorded in the morning. This is because in the evening a driver will tend to want to park in the garage and over the day in front of the house.

According to another embodiment, the driving assistance apparatus can be acted upon by a trailer signal which indicates whether the vehicle is towing a trailer in the trajectory recording and this trailer signal can be stored for each trajectory recording. Consequently, a trajectory can preferentially be suggested to the driver which covers the same conditions, that is specifically if a trailer is being towed, a trajectory recorded with a trailer and conversely.

The driver communication unit enables the input of additional information, preferably a trajectory name, and trajectory explanations, when storing the trajectory, in another embodiment. Such an input can either be made manually or by verbal naming and preferably converted into text by means of a speech recognition system. The available trajectories can thus be offered to the driver visually and/or acoustically.

According to an embodiment, when selecting a trajectory to be driven along, additional alternatives can be selected, in particular accessibility of the doors or the trunk. On certain trajectories it can be expedient to automatically deviate from the predefined route, for example when the front passenger door or the trunk is to be accessible. In this case, the end position of the vehicle would deviate from the stored end value with an appropriate selection. If the front passenger door is to be accessible, the vehicle could accordingly be parked more to the left or for access to the trunk, further to the front.

BRIEF DESCRIPTION OF THE DRAWINGS

The various embodiments will hereinafter be described in conjunction with the following drawing figures, wherein like numerals denote like elements, and wherein:

The FIGURE shows a schematic diagram of a preferred driving assistance apparatus in accordance with an exemplary embodiment.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

The FIGURE illustrates an exemplary driving assistance apparatus 10 including a central data processing unit 11 for controlling processes described below. The driving assistance apparatus also has a data acquisition unit 12, which is connected to a plurality of sensors, in particular wheel sensors 14, a yaw rate sensor 15, and a steering angle sensor 16 in order to determine route data of a route (trajectory) to be covered on the basis of the sensor signals. These route data are then stored in a trajectory storage unit 18. The driving assistance apparatus 10 further comprises a triggering unit 20, which brings about a triggering of the motor vehicle (not shown) on the basis of the trajectories stored in the trajectory storage unit 18, in particular by controlling the vehicle steering device 22, the vehicle gear shift 24, and the gas pedal 26. The motor vehicle is thus in a position to automatically drive along the route of an arbitrary trajectory stored in the trajectory storage unit 18 and, specifically controlled by the data processing unit 11, either in the recorded or the reverse direction of travel.

In an embodiment, the driving assistance apparatus 10 is connected to a satellite navigation receiver 28, which is preferably configured as a GPS or Galileo receiver or similar in order to deliver absolute position data (relative to an Earth coordinate system such as WSG 84) of the motor vehicle whereabouts. The data processing unit 11 stores the absolute position data at least for the initial and end value of each trajectory so that the absolute position data can thus be determined at each point of the trajectory. The absolute position value of the satellite navigation receiver 28 is expediently only used for one boundary value and the second boundary value is calculated from this by the route data since the accuracy of the satellite navigation determination is considerably lower than the position data determined by the sensors 14, 16 and therefore the calculation of the second boundary value leads to a more conclusive result than if both boundary values are determined from satellite navigation data.

Alternatively the absolute position data can be co-recorded for each route point which, however, is preferred if the satellite navigation receiver 28 provides sufficiently accurate position data, for example by differential GPS.

In another embodiment, the driving assistance apparatus 10 further comprises an approach checking unit 30, which during the journey permanently compares the current position signal of the satellite navigation receiver 28 with the boundary value position data stored in the trajectory storage unit 18 and checks whether the distance from one of the boundary value position data is below a stipulated threshold value, for example, 20 m or 100 m. If this is the case, the approach checking unit 30 produces a position approach signal that is processed by the data processing unit 11.

In a further embodiment, the driving assistance apparatus 10 further comprises a driver communication unit 32, which comprises one or more optical and/or acoustic and/or haptic signaling units 34, in order to signal specific events to the driver and at least one haptic and/or acoustic input unit 36 for the driver, by which the driver communicates with the driving assistance apparatus 10. The afore-mentioned position approach signal is thus output to the driver via signaling units 34, for example, by text output on a display and simultaneous output of an announcement text—similar to the announcement texts of a navigation device—via loudspeaker. The driver can then decide whether the trajectory should be driven along and activate a corresponding input unit 36, for example, by pressing a button or speaking a word that can be analyzed by the data processing unit 11.

The driving assistance apparatus 10 further comprises a digital map unit 38, in which information about road topology and road class data are stored, according to an embodiment. Alternatively, this unit receives the map data from other sources, preferably via a CAN interface or another communication channel. Road class data is understood as information about whether a road is a freeway, expressway, a parking space, or a blind alley. The map data can thus originate from other data sources inside the vehicle, for example, a navigation system, or external road information or road class data can be loaded via external environmental communication channels. Communication with the digital map unit 38 is preferably accomplished via a CAN bus system (controller area network) 39 of the vehicle.

Further, the digital map unit 38 preferably additionally contains environmental data, e.g. of buildings or similar obstacles. By reference to this road class data, the data processing unit 11 can check whether a route recording is suggested to the driver or introduced automatically.

In another embodiment, the driving assistance apparatus 10 is further coupled to environmental detection sensors 40 such as are provided in modern motor vehicles, in particular image recording and/or ultrasound sensors. If image recording devices are used, the data processing unit 11 is coupled to an image processing unit 42, which can detect objects in the surroundings and creates corresponding object data, which are preferably also deposited in the trajectory storage unit 18 and can be used when determining suitable road ways deviating slightly from the stored trajectory. The environmental detection sensors 40 can also comprise weather sensors (outside temperature, outside humidity sensors). Thus, the driver can be offered a suitable trajectory depending on the weather (e.g. in rain or snowfall, a trajectory leading to a garage space would be preferentially proposed over a road parking space).

The environmental detection sensors 40 can further comprise a trailer sensor by which means it is determined whether a trailer is suspended on a trailer coupling provided. This information would then be co-stored when recording a trajectory.

In a further embodiment, the driving assistance apparatus 10 further comprises an environmental data matching unit 44 which matches object data determined by the environmental detection sensors 40 by the image processing unit 42 with the object data located in the digital map unit 38 in order to produce a correct image of the surroundings which is then stored for the route data.

The trajectory storage unit 18 provided in the driving assistance apparatus 10 comprises a ring storage region 46, which records the current position data automatically or in response to express driver instruction and overwrites the oldest data. Thus, a certain section of the route last covered is available for permanent storage.

In an embodiment, the driving assistance apparatus 10 further communicates with a driver identification unit 48, which produces its own identification signal for each driver, for example, by an RFID tag provided in the ignition key. By this information, the data processing or the information output to the driver can be accomplished depending on the person.

In another embodiment, the driving assistance apparatus 10 further comprises a trajectory introducing unit 50 that determines by reference to the current absolute position data determined by the satellite navigation receiver 28 an optimal route from a position lying not on a stored trajectory taking into account stored object data to arrive at a specific trajectory without touching obstacles.

An embodiment of the storage of routes/trajectories is now described. Thus, a vehicle fitted with the driving assistance apparatus 10 can be activated by the driver to store a first route or trajectory by activating the driver communication unit 32. Thereupon, the data processing unit 11 reads the current absolute position data from the satellite navigation receiver 28 and stores this in the trajectory storage unit 18. Further, the clock time and the date of the recording are preferably stored. The further vehicle movements brought about by the driver are recorded at least by the wheel sensors 14 and the steering angle sensor 16 and the inertial measurement technique.

Other sensors provided in the vehicle which record the gas pedal position or the gear shift position can further be read out. Route data are calculated cyclically from this, which are stored in the trajectory storage unit 18 for the trajectory concerned.

Information about the environment is further determined by the environmental detection sensors 40, evaluated in the image processing unit 42, and environmental data about objects and obstacles in the surroundings of the trajectory are determined from this and from the data of the digital map unit 38 and likewise stored in the trajectory storage unit 18. When the vehicle comes to a standstill, the data recording is ended and the trajectory deposited permanently in the trajectory storage unit 18. The driver can be asked beforehand via the driver communication unit 32 whether the trajectory should actually be stored permanently. Further, the stored route/trajectory is preferably provided with a driver identification mark from the driver identification unit 48 in order to assign this to the driver concerned. It is also possible to offer the driver the possibility via the driver communication unit 32 to designate the stored trajectory (e.g. "home garage") manually by buttons or by speech input. A typical stored route/trajectory has a length of about 5 to 100 m.

In this or similar manner a plurality of routes or trajectories can be recorded in the course of time and stored in the trajectory storage unit 18.

For use of the stored trajectories during the journey the approach checking unit 30 checks the stored trajectories to determine whether the vehicle is approaching a boundary value (initial or end value) of one of the stored routes. If this is the case and one distance value is exceeded (adjustable by the user), a position approach signal is produced. The data processing unit 11 then initially checks whether further stored trajectories exist which lie spatially in the vicinity of the trajectory concerned, for example, a plurality of alternative approach routes to a parking space (e.g. with or without trailer) or a plurality of alternative parking spaces (e.g. in a garage or in an inner courtyard or on the street). Now, the one trajectory or, if several are possible, all the possible trajectories are signaled to the driver via the driver communication unit 32, for example, by speech output and display. This signaling can be made dependent on the driving speed, e.g., only when the vehicle is stationary or traveling at a low speed (e.g., less than 5 km/h) because with a faster traveling vehicle it is unlikely that the driver wishes to drive into a parking space, etc.

If the driver signals via the driver communication unit 32 that he is going to drive along the trajectory concerned or selects one trajectory when several are possible, the data processing unit 11 will activate the triggering unit 20, which by the data retrieved from the trajectory storage unit 18 causes the vehicle to drive along the trajectory. If the vehicle is not yet located on the trajectory at this time, a suitable route is determined in advance by the trajectory introducing unit 50 and driven along in order to move the vehicle automatically on the trajectory route. In an embodiment, the driver can intervene in the movement process.

When selecting a trajectory, the driver can be offered the possibility via the driver communication unit 32 to input end point deviations in order, for example, to allow accessibility to the trunk or to passenger doors. If the driver wishes the trunk to be accessible, the parking position is shifted forward depending on signals of the environmental detection sensors 40 so that sufficient space remains behind the vehicle. Accordingly, for accessibility of the front passenger door, the end position would be shifted more to the left depending on the signals of the environmental detection sensors 40.

As noted above, a trailer sensor signal can also be stored. When making the choice of trajectory, it can be examined whether the vehicle is currently towing a trailer and then trajectories having the same conditions are preferentially suggested. When selecting a trajectory recorded without a trailer, a correction to the course to be driven can alternatively be made by the data processing unit 11 in order to allow for cornering of a trailer.

With use of the driving assistance apparatus 10, it is not only easier to drive into narrow garages or parking spaces but also to drive over longer areas such as blind alleys or narrow lanes in old localities. For example, maneuvering in narrow rear courtyards requiring driving forward and in reverse many time can be made easier. It is naturally also possible to achieve activation by remote control so that the driver can leave the vehicle before driving along the trajectory.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A driving assistance apparatus for a motor vehicle for assistance with driving along narrow roadways, the driving assistance apparatus comprising:
    a data acquisition unit configured for acquiring route data while driving on a route to be obtained from wheel and steering angle sensors;
    a trajectory storage unit configured for recording the route data of the data acquisition unit, wherein the driving assistance apparatus is coupled to a satellite navigation receiver for determining boundary value position data at a time of commencement and/or end of the route and the trajectory storage unit is configured for storing the boundary value position data for the route data;
    a triggering unit configured for triggering the motor vehicle on a basis of the route data recorded by the trajectory storage unit, for driving along the route in the same or reverse direction; and
    an approach checking unit configured to check whether the motor vehicle is approaching a commencement or end of the route based on the boundary value position data and to generate a position approach signal if the motor vehicle is approaching the commencement or end of the route, and
    wherein the position approach signal is supplied to a driver communication unit, which is configured to provide a driver of the motor vehicle with an option for activating an automatic driving of a corresponding route and optionally activates the triggering unit for autonomous driving of the route by the motor vehicle, and
    wherein, when selecting a route to be driven, the driver communication unit selects accessibility of a door and/or a trunk of the motor vehicle.

2. The driving assistance apparatus according to claim 1, wherein the driver communication unit is configured to enable input of route name and/or route explanations when storing the route.

3. The driving assistance apparatus according to claim 1, further comprising a digital map unit with road map information that, by reference to current position data delivered by the satellite navigation receiver, is configured to produce road class data and/or environmental data from the road map information.

4. The driving assistance apparatus according to claim 3, wherein the digital map unit comprises map data with position attribute data for checking whether the motor vehicle is located in a vicinity of road areas with restricted scope for navigation and in such a case suggests the recorded route data that is recorded by the trajectory storage unit acquired by the data acquisition unit, wherein the recorded route data is activated as a trajectory by a driver or is executed using the triggering unit in an automated manner.

5. The driving assistance apparatus according to claim 3, further comprising environmental detection sensors configured for recording the environmental data when driving along the route and wherein the trajectory storage unit stores the environmental data for corresponding route data.

6. The driving assistance apparatus according to claim 5, wherein the environmental detection sensors comprise optical sensors and further comprising an image processing unit configured to create object data of objects located in a vicinity of the route by the environmental data, wherein the trajectory storage unit stores the object data on the corresponding route data.

7. The driving assistance apparatus according to claim 6, wherein the trajectory storage unit comprises an additional circular buffer region configured to store the route data during motion of the motor vehicle and optionally additionally the environmental data and/or the object data and deletes the oldest data in each case.

8. The driving assistance apparatus according to claim 5, wherein the environmental detection sensors further comprise a trailer sensor configured to produce a trailer signal that indicates whether the motor vehicle is towing a trailer in a route recording and wherein the trailer signal is stored when recording a route.

9. The driving assistance apparatus according to claim 5, further comprising an environmental data matching unit, which is configured to match object data determined by the environmental detection sensors with the environmental data located in the digital map unit.

10. The driving assistance apparatus according to claim 5, wherein the environmental detection sensors are configured to detect curbstones and the triggering unit is further configured for determining whether a lateral offset can be driven based on data from the environmental detection sensors.

11. The driving assistance apparatus according to claim 1, wherein the driving assistance apparatus communicates with a driver identification unit that is configured to produce an individual identification signal for an individual driver and wherein, in the trajectory storage unit, individual route data is stored for each respective individual driver and when specific states arise, the individual route data stored for the relevant individual driver is retrieved.

12. The driving assistance apparatus according to claim 1, further comprising a trajectory introducing unit that is configured to determine a suitable route on which the motor vehicle can be moved in a selected trajectory.

13. The driving assistance apparatus according to claim 1, further comprising a time unit configured to store a recording time for each route recorded.

14. The driving assistance apparatus according to claim 1, wherein the driving assistance apparatus can be automatically deactivated when predetermined road classes occur.

* * * * *